US008154797B2

(12) United States Patent
Steffen et al.

(10) Patent No.: US 8,154,797 B2
(45) Date of Patent: *Apr. 10, 2012

(54) SURGICAL MICROSCOPE FOR USE IN SURGICAL PROCEDURES INCLUDING NEUROSURGERY

(75) Inventors: Joachim Steffen, Westhausen (DE); Michael Haisch, Aalen (DE); Frank Rudolph, Aalen (DE); Martin Schneider, Königsbronn (DE); Hans-Joachim Miesner, Aalen (DE); Nicole Brune, Munich (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/051,545

(22) Filed: Mar. 18, 2011

(65) Prior Publication Data

US 2011/0164315 A1  Jul. 7, 2011

Related U.S. Application Data

(63) Continuation of application No. 11/892,443, filed on Aug. 23, 2007, now Pat. No. 7,933,066.

(30) Foreign Application Priority Data

Aug. 25, 2006 (DE) .......................... 10 2006 039 802
Oct. 10, 2006 (DE) .......................... 10 2006 047 723

(51) Int. Cl.
  *G02B 21/06* (2006.01)
(52) U.S. Cl. ...................................... 359/390; 359/385
(58) Field of Classification Search .................. 359/385, 359/390
See application file for complete search history.

(56) References Cited

U.S. PATENT DOCUMENTS

| 3,973,827 | A | | 8/1976 | Uetake |
| 4,878,746 | A | | 11/1989 | Nakano et al. |
| 5,838,491 | A | * | 11/1998 | Gartner et al. ................ 359/385 |
| 5,865,829 | A | * | 2/1999 | Kitajima ........................... 606/3 |
| 6,224,589 | B1 | | 5/2001 | Brenner et al. |

(Continued)

FOREIGN PATENT DOCUMENTS

DE     195 13 350     10/1995

(Continued)

OTHER PUBLICATIONS

Brochure Carl Zeiss Surgical Products Division entitled "Unique OPMI^R Pentero^TM" dated 2004.

*Primary Examiner* — Arnel C Lavarias
(74) *Attorney, Agent, or Firm* — Walter Ottesen

(57) ABSTRACT

A surgical microscope has an illuminating arrangement for illuminating light in an operating region to be examined with the surgical microscope. The arrangement contains a high-power light source which includes an intensity adjusting device. The device makes possible an adjustment of the intensity of the illuminating light, which is guided to the object region, between a maximum value and a minimum value. The microscope has a control unit for the illuminating arrangement which includes an operator-controlled module via which the illuminating arrangement can be activated and controlled. For adjusting the intensity of the illuminating light guided to the operating region, the control unit coacts with the adjustable filter unit. A signal generator outputs a warning signal when an intensity of the illuminating light is adjusted via the operator-controlled module which exceeds the safety limit value stored in a memory.

42 Claims, 4 Drawing Sheets

U.S. PATENT DOCUMENTS

| | | |
|---|---|---|
| 6,525,874 B2 | 2/2003 | Yamawaki |
| 6,577,453 B2 * | 6/2003 | Kimura ......................... 359/730 |
| 6,909,499 B2 | 6/2005 | Sander |
| 6,947,861 B2 * | 9/2005 | Olschewski ................... 702/76 |
| 7,234,815 B2 | 6/2007 | Bees |
| 7,262,909 B2 | 8/2007 | Boesser et al. |
| 7,933,066 B2 * | 4/2011 | Steffen et al. ................. 359/390 |
| 2002/0113941 A1 | 8/2002 | Bees |
| 2002/0149845 A1 | 10/2002 | Mayer |
| 2003/0181803 A1 | 9/2003 | Sander |
| 2004/0174592 A1 * | 9/2004 | Sander ......................... 359/388 |
| 2005/0117210 A1 | 6/2005 | Ott |
| 2006/0087729 A1 | 4/2006 | Oelckers et al. |

FOREIGN PATENT DOCUMENTS

| | | |
|---|---|---|
| DE | 195 38 382 | 4/1996 |
| DE | 199 14 495 | 11/2000 |
| DE | 20 2005 019 715 U1 | 3/2006 |

* cited by examiner

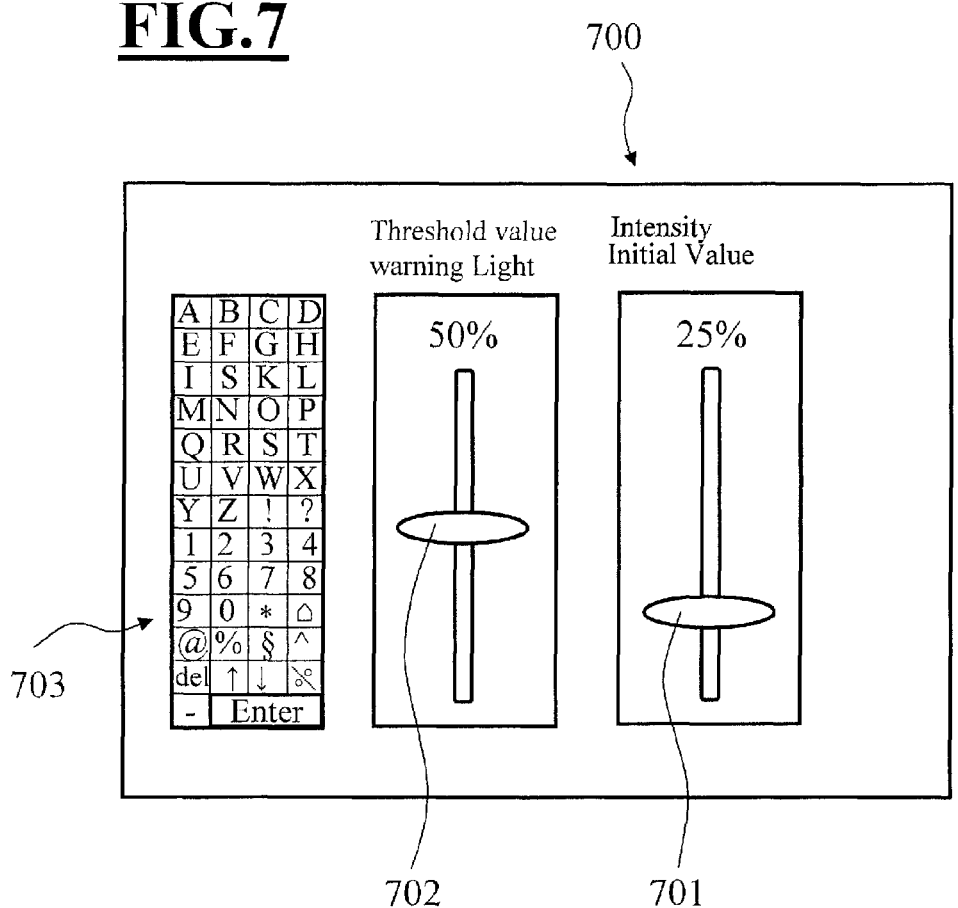

SURGICAL MICROSCOPE FOR USE IN SURGICAL PROCEDURES INCLUDING NEUROSURGERY

CROSS REFERENCE TO RELATED APPLICATIONS

This is a continuation application of U.S. patent application Ser. No. 11/892,443, filed Aug. 23, 2007, (now U.S. Pat. No. 7,933,066 B2) and claims priority of German patent application nos. 10 2006 039 802.5 and 10 2006 047 723.5, filed Aug. 25, 2006 and Oct. 10, 2006, respectively, and the entire contents of the above applications are incorporated herein by reference.

FIELD OF THE INVENTION

The invention relates to a surgical microscope, especially for neurosurgery. The surgical microscope has an illuminating arrangement for making available illuminating light in an operating region to be examined with the surgical microscope. The illuminating arrangement includes a high-power light source and an intensity adjusting device for setting the intensity of the illuminating light, which is guided to the operating region, between a maximum value and a minimum value. The surgical microscope also includes a control unit for the illuminating arrangement and this control unit includes an operator-controlled module via which the illuminating arrangement can be controlled. The control unit is operatively connected to the intensity adjusting device for adjusting the intensity of the illuminating light guided to the operating region.

BACKGROUND OF THE INVENTION

A surgical microscope of the kind referred to above is manufactured and sold by Carl Zeiss Surgical GmbH under the designation OPMI® Pentero™. This surgical microscope is designed for neurosurgery and has an illuminating arrangement for illuminating the operating region or region of surgery with a 300 watt xenon high-power light source. The intensity of the illuminating light, which is made available by the illuminating arrangement, can be adjusted quasi-continuously with a filter diaphragm between a minimum value and a maximum value. The surgical microscope makes possible a visualization of the regions of surgery with fluorescence light in the infrared and blue spectral range.

It is necessary to illuminate well the finest tissue structures in order to make them visible with a surgical microscope. This requires a power intense illuminating arrangement in the surgical microscope. In the illuminating arrangements of surgical microscopes for neurosurgery and HNO-surgery, high-power light sources are therefore used. Illuminating light, which is guided to an operating region, interacts, however, with body tissue. This leads especially to warming and can, for the case that the illuminating intensity is too high, cause persistent damage to tissue structures even when the ultraviolet and infrared light, which is outputted by the high-power light source, is filtered out.

In order to be able to optimally adjust a surgical microscope for a surgical procedure, it is advantageous when the surgeon has the possibility to vary especially the intensity and spectral composition but also the size of the illuminated area of the illuminating light as well as the working distance of the surgical microscope with reference to the object region. The illuminating light is generated with the illuminating arrangement in the surgical microscope.

SUMMARY OF THE INVENTION

It is an object of the invention to provide a surgical microscope wherein damage to the tissue structures of a patient because of faulty manipulation is prevented notwithstanding an illuminating arrangement having a high variability with respect to the intensity of the illuminating light made available.

The surgical microscope of the invention is for use in surgical procedures including neurosurgery. The surgical microscope includes: an illuminating arrangement for providing and guiding illuminating light along a beam path to a region of surgery examined with the surgical microscope; the illuminating arrangement including a high-power light source for generating the illuminating light; an intensity adjusting device for adjusting the intensity of the illuminating light guided to the region of surgery between a maximum value and a minimum value; a control unit for the illuminating arrangement; the control unit including an operator-controlled module via which the illuminating arrangement is activated and controlled; the control unit being operatively connected to the intensity adjusting device for adjusting the intensity of the illuminating light guided to the region of surgery; a memory for storing a safety limit value; and, a signal generator for outputting a warning signal when an intensity of the illuminating light is set via the operator-controlled module which exceeds the safety limit value.

In a further embodiment of the invention and in the case of an activation of the illuminating arrangement via the operator-controlled module, the control unit effects an adjustment of the filter unit to a first illuminating arrangement activation value whereat the light of the high-power light source is attenuated in the illuminating arrangement. In this way, a surgical microscope is provided which, when switching on the illuminating arrangement, does not burden a surgical region with too much illumination light.

In a further embodiment of the invention, the operator-controlled module includes a device for adjusting the first illuminating arrangement activation value. In this way, the thermal sensitivity of different body tissues, which are operated upon, can be taken into account.

In another embodiment of the invention, a signal generator is provided which outputs a warning signal when a first illuminating arrangement activation value is adjusted via the operator-controlled module which activation value exceeds a safety limit value for the first illuminating arrangement activation value with the safety limit value being stored in a memory. In this way, an operator is informed that the danger of tissue damage is present with the adjusted apparatus setting during operation of the surgical microscope.

In a further embodiment of the invention, the illuminating arrangement includes a spectral filter for adjusting the spectral composition of the illuminating light from the illuminating arrangement. In this way, it is possible to avoid that an operating region is loaded with illuminating light that does not contribute to the formation of an image.

In a further embodiment of the invention, the spectral filter is configured as a thermal protective filter. In this way, the load on the operating region with thermal radiation can be prevented.

In another embodiment of the invention, the spectral filter is configured as an infrared fluorescence excitation filter. In this way, body tissue can be visualized while utilizing fluorescence dyes which emit infrared light during fluorescence.

In a further embodiment of the invention, the spectral filter is configured as a blue-light fluorescence excitation filter. In this way, the fluorescence light examination of a surgical region is made possible in the blue spectral range.

In a further embodiment of the invention, the operator-controlled module has an input unit for setting the infrared fluorescence operating mode wherein the infrared fluorescence excitation filter is switched into the viewing beam path of the illuminating arrangement. In this way, it is possible to work ergonomically with the surgical microscope.

In a further embodiment of the invention, the control unit effects a setting of the filter unit to a second illuminating arrangement activation value when setting the infrared fluorescence operating mode via the input unit of the operator-controlled module. In this way, it can be avoided that patient tissue is subjected to fluorescence excitation light of too high an intensity when switching over the surgical microscope into an operating mode for infrared fluorescence.

In a further embodiment of the invention, the operator-controlled module has a means for adjusting the second illuminating arrangement activation value. In this way, the surgical microscope can be configured in correspondence to the requirements of a surgical procedure to be carried out.

In still another embodiment of the invention, the surgical microscope includes a signal generator which outputs a warning signal when a second illuminating arrangement activation value is adjusted via the operator-controlled module with this second activation value exceeding a safety limit value for the second illuminating arrangement activation value with the safety limit value being stored in a memory. In this way, an operator is advised of the danger that patient tissue can be excessively subjected to load by the illuminating light of the illuminating arrangement of the surgical microscope.

In another embodiment of the invention, the operator-controlled module of the surgical microscope has an input unit for setting a blue-light fluorescence operating mode wherein the blue-light fluorescence excitation filter is switched into the illuminating beam path of the illuminating arrangement. In this way, the surgical microscope can be configured to be operator friendly for a blue-light fluorescence operating mode.

In a further embodiment of the invention, the control unit effects an adjustment of the filter unit to a third illuminating arrangement activation value when setting the blue-light fluorescence operating mode via the input unit of the operator-controlled module. In this way, an excessive load on the tissue with blue-light fluorescence is avoided during operation of the surgical microscope.

In still another embodiment of the invention, the operator-controlled module includes means for setting the third illuminating arrangement activation value. In this way, it is possible to configure the surgical microscope for surgery while using dyes which fluoresce with blue light and to quickly arrange for their use with respect to body tissue whose light sensitivity is different.

In another embodiment of the invention, a signal generator is provided in the surgical microscope which outputs a warning signal when a third illuminating arrangement activation value is set via the operator-controlled module with this activation value exceeding a safety limit value for the third illuminating arrangement activation value. The safety limit value is stored in a memory. In this way, the possibility is provided to inform an operator of the danger of tissue damage during a surgical procedure wherein the surgical microscope is utilized.

In another embodiment of the invention, the operator-controlled module includes means for adjusting the filter unit between a value for minimum intensity of the illuminating light of the illuminating arrangement and a second value for maximum intensity of the illuminating light of the illuminating arrangement. In this way, a surgeon is afforded the possibility to so adjust the light quantity that the area of surgery can always be well seen. The light quantity is made available with the illuminating arrangement of the surgical microscope during a surgical procedure.

In another embodiment of the invention and in the surgical microscope, the maximum adjustable value for the intensity of the illuminating light corresponds to the first, second or third safety limit value stored in the memory. In this way, it is avoided that a surgeon inadvertently operates the illuminating arrangement of the surgical microscope in a range wherein the danger of tissue damage exists.

In a further embodiment of the invention, the operator-controlled module has means for setting the second value for maximum intensity of the illuminating light of the illuminating arrangement. In this way, the deterioration of a light source can be considered in a surgical microscope which can lead to the situation that the light power falls off with increasing duration of service with this light power being outputted by a light source.

In a further embodiment of the invention in a surgical microscope, a lamp exchange detection unit is provided which is connected to the control unit and effects a setting of the filter unit to a start value when a lamp exchange is detected. In this way, it is ensured that the surgical microscope illuminating arrangement does not have an illuminating light of too high an intensity directly after a lamp exchange.

In a further embodiment of the invention, the surgical microscope contains a sensor for detecting the intensity of the illuminating light made available by the illuminating arrangement. In this way, it is possible to automatically detect when it is favorable to undertake a lamp exchange.

In a further embodiment of the invention, means for adjusting the filter unit are provided in the illuminating arrangement of the surgical microscope which include a control loop which controls the intensity of the illuminating light, which is outputted by the illuminating arrangement, to a pregiven value. In this way, it is possible to automatically compensate the light power, which drops with increasing duration of service of a light source, whereby a brightness impression of a surgical microscope is made possible. This brightness impression is independent of the duration of service of the light source.

BRIEF DESCRIPTION OF THE DRAWINGS

The invention will now be described with reference to the drawings wherein:

FIG. 7 shows the input menu of the control unit for the illuminating arrangement.

DESCRIPTION OF THE PREFERRED EMBODIMENTS OF THE INVENTION

Figure 1:
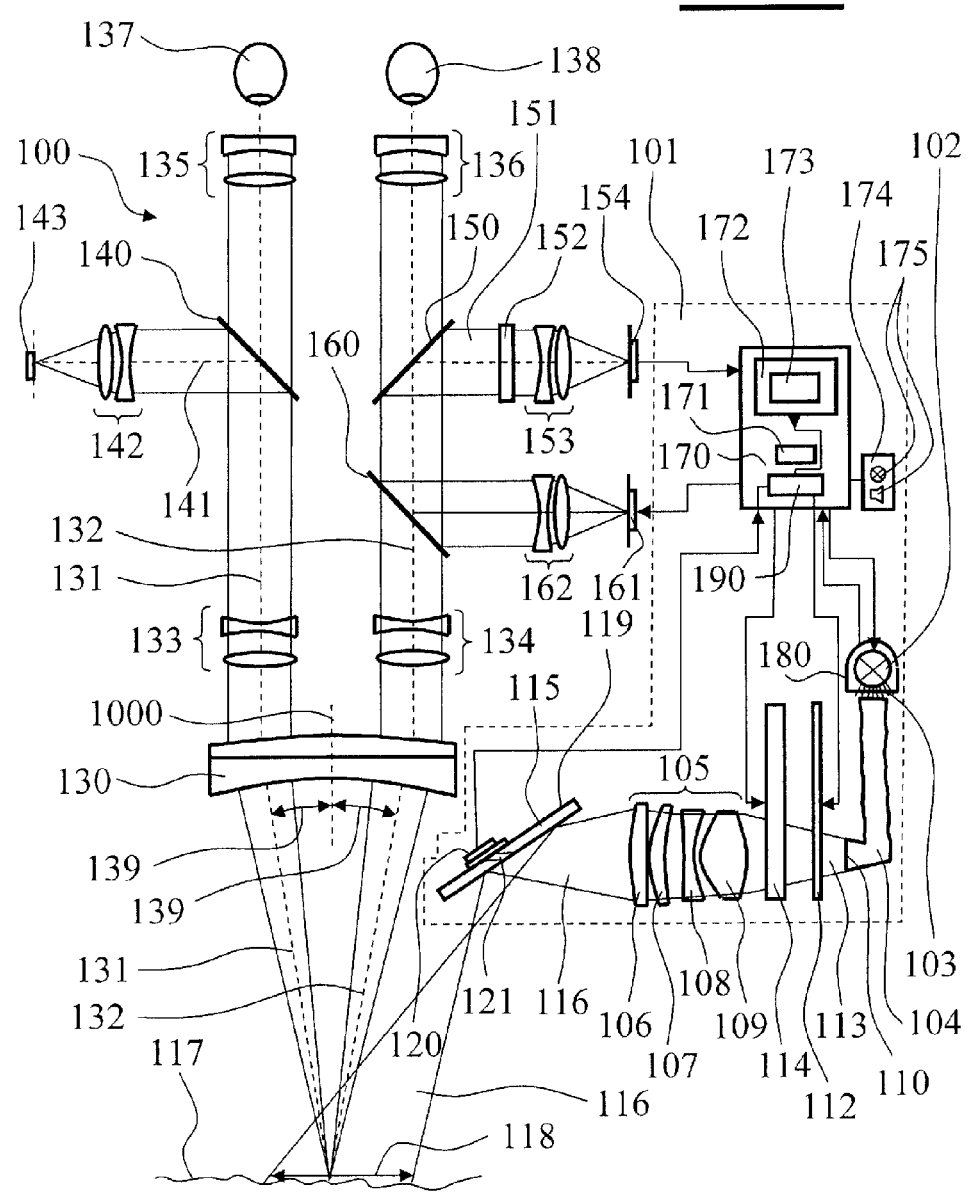
FIG. 1 is a schematic of a surgical microscope for neurosurgery having a control unit which contains an operator-controlled module in order to control an illuminating arrangement.

In FIG. 1, a surgical microscope 100 is shown having an illuminating arrangement 101. The illuminating arrangement 101 contains a high-power light source 102 in the form of a powerful xenon lamp. The high-power light source 102 generates illuminating light 103 which is supplied to a light conductor 104 in the illuminating arrangement 101. The illuminating arrangement 101 has an adjustable illuminating optic 105 having four lenses (106, 107, 108, 109). An adjustable filter unit 112 is mounted between the illuminating optic 105 and the exit end 110 of the light conductor 104. The adjustable filter unit 112 is configured as a sieve filter as described, for example, in published German patent application 195 13 350 A1. The filter unit functions as a means for adjusting the intensity of the illuminating light from the illuminating unit 101. The filter unit attenuates the illuminating light 113, which exits from the light conductor, in correspondence to an adjustable attenuating factor which lies between 0% and 100%.

A filter wheel 114 is assigned to the filter unit 112 and has filters for adjusting the spectral composition of the illuminating light 113 which is guided in the illuminating arrangement 101 to the illuminating optic 105.

The illuminating arrangement 101 further has a path-folding mirror 115. The illuminating light 116, which exits from the illuminating optic 105, is directed to an object region 117 by the path-folding mirror 115. The illuminating light 116 forms there an illuminating area 118.

An illuminating light intensity detector 120 is mounted on the rearward side 119 of the path-folding mirror 115. The illuminating light intensity detector 120 receives a fraction of the illuminating light via a bore 121 in the path-folding mirror 115. This illuminating light is guided by the illuminating optic 105 to the path-folding mirror 115.

The surgical microscope 100 further includes a microscope main objective 130. A left viewing beam path 131 and a right viewing beam path 132 pass through the microscope main objective 130. An adjustable zoom system (133, 134) is mounted in the left and right viewing beam paths (131, 132), respectively, on the side of the microscope main objective 130 which faces away from the object. The surgical microscope further has a binocular tube having oculars (135, 136).

A viewer, who looks into the oculars (135, 136) with the eyes (137, 138), can see the object region 117 magnified and stereoscopically at a stereo angle 139 with reference to the optical axis 1000 of the microscope main objective 130.

A beam splitter 140 is mounted in the left viewing beam path 131 of the surgical microscope 100. This beam splitter 140 couples a portion of the viewing light 141 out from the viewing beam path 131 and guides the same via an imaging optic 142 to a first camera 143.

A beam splitter 150 is mounted in the right viewing beam path 132 of the surgical microscope. The beam splitter 150 couples a portion of the viewing light 151 out of the right viewing beam path 132 and guides the same through a filter 152 via an imaging optic 153 to a second camera 154. The filter 152 is matched for fluorescence light of the fluorescent dye indocyangreen (ICG) and is transmissive essentially only for light of the wavelength range between 820 nm and 870 nm.

A beam splitter 160 is provided in the right viewing beam path 132 of the microscope 100. This beam splitter 160 functions to couple in image signals and read-out signals of a display 161 to which an imaging optic 162 is assigned.

The surgical microscope 100 is designed for examining the object region 117 with white light. The object region 117 can, however, be examined with the surgical microscope 100 by viewing fluorescent light which is generated in the object region 117.

A fluorescent dye is needed in the object region for generating fluorescence light therein. A fluorescent dye can be excited to fluorescence by illuminating light of suitable spectral composition. In this way, light results whose spectral characteristic is different from that of the excitation light.

The illuminating arrangement 101 is so designed that the dyes ICG and 5-ALA can be excited to fluorescence with the illuminating light 116. The illuminating light 116 forms the illuminated area 118 in the object region and the dyes ICG and 5-ALA are suitable for enriching body tissue of a patient in a surgical procedure.

The dye ICG can be excited to fluorescence with light of the wavelength 780 nm in the red spectral range. The fluorescent light, which is outputted by the dye, lies in the infrared spectral range at 835 nm and is not visible to the human eye.

In order to make visible an image of the object region 117, which is based on fluorescence light of the dye ICG, an image conversion is needed. This takes place by means of the second camera 154 in the surgical microscope 100. Only light from one wavelength range is supplied to the second camera 154 via the filter 152 and this light has a spectral composition which corresponds to that of the fluorescence light of ICG. The camera 154 is connected to the display 161. In this way, the image signal, which is not visible to the human eye and is detected by the camera 154, is transformed into an image signal which the human eye can see. This image is made visible by in-coupling into the right viewing beam path when activating the illuminating arrangement for the excitation of the fluorescence of ICG.

Images of the object region 117 from fluorescence light, which are based on the fluorescence light of the dye "blue" 400, can, in contrast, be seen by the naked eye in the surgical microscope 100. In order to transfer the surgical microscope 100 into an operating mode for viewing the fluorescence of the dye "blue" 400, a filter is switched into the viewing beam path by shifting filter wheel 114 in the illuminating arrangement 101, which filter is transparent for light with which the fluorescence of the dye "blue" 400 can be excited and which, however, does not transmit the light of the fluorescence wavelengths of this dye.

Figure 2:
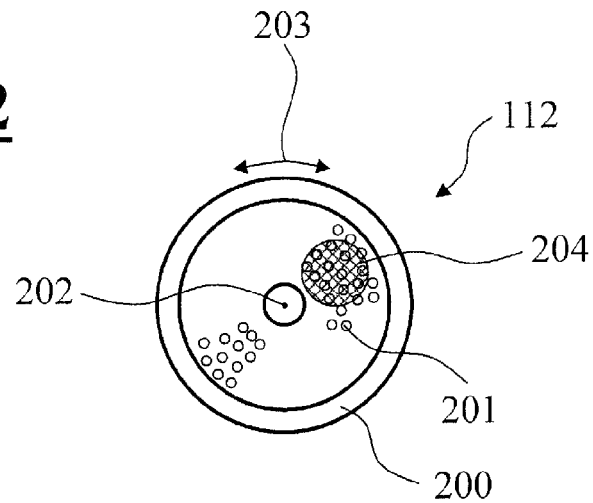
FIG. 2 shows a filter unit of the surgical microscope of FIG. 1 with the filter unit being configured as a sieve filter.

FIG. 2 shows the filter unit 112 for attenuating the intensity of the illuminating light which is generated by the high-power light source 102 of the illuminating arrangement. The filter unit 112 is configured as a sieve filter and includes a non-transmissive sieve filter disc 200 which has a plurality of passthrough openings 201 for light with the openings having different sizes. In that the disc 200 is moved in the illuminating beam path 204 of the illuminating arrangement about its axis 202 in correspondence to the double arrow 203, the disc 200 controls the light flux in accordance with number and size of the light passthrough openings 201 which are disposed in the viewing beam path 204.

Figure 3:
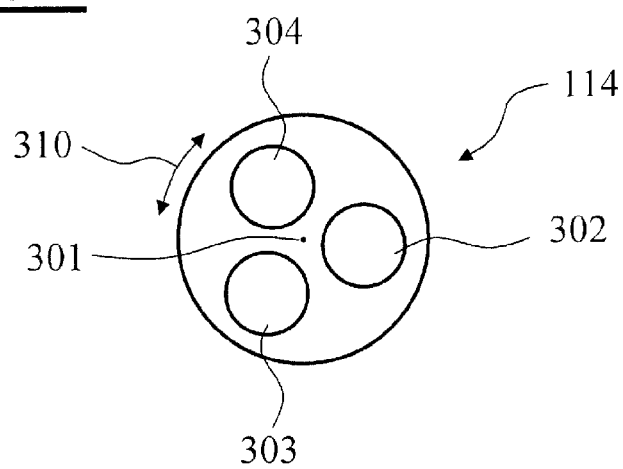
FIG. 3 shows a filter wheel in the surgical microscope of FIG. 1 having several filter discs.

FIG. 3 shows the filter wheel 114 of the illuminating arrangement 101 of FIG. 1 for adjusting the spectral composition of the illuminating light generated by the high-power light source 102. The filter wheel 114 can be moved about an axis 301 in the viewing beam path in correspondence to the double arrow 310. The filter wheel 114 contains filter discs (302, 303, 304) which control the illuminating light of the high-power light source 102 of FIG. 1 for an operation of the surgical microscope in the following: the white-light mode and in a mode wherein the dye ICG can be excited to fluorescence as well as in a mode which makes it possible to excite the dye 5-ALA to fluorescence.

Figure 4:
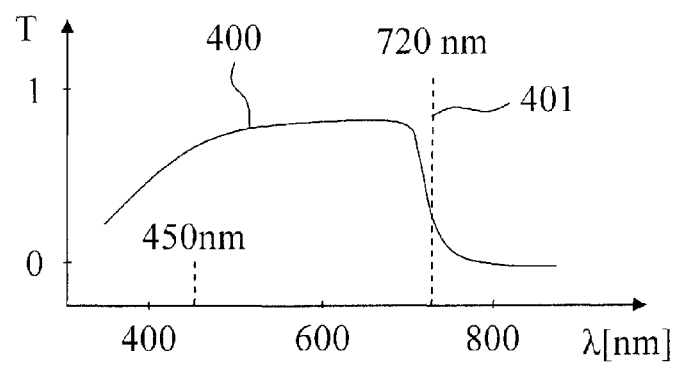
FIG. 4 shows the filter characteristic of a first filter disc.

FIG. 4 shows the filter characteristic 400 of the filter disc 302 which is switched into the illuminating beam path during operation of the surgical microscope in the white-light mode. The filter disc 302 functions as a heat protective filter. The filter disc 302 is transparent for illuminating light in the visible spectral range having a wavelength lying between 400 nm and 720 nm. The filter characteristic 400 falls off for light of the wavelength below 450 nm. A filter edge 401 results at 720 nm. Light in the ultraviolet range, whose wavelength lies below 400 nm and light having wavelengths greater than 720 nm in the infrared spectral range is blocked by the filter disc 302 of FIG. 4. During operation of the surgical microscope in the white-light mode, this ensures that patient tissue is not unnecessarily subjected to thermal radiation and ultraviolet radiation which make no contribution to the image of an object region, which is visible to humans and which can be observed with the surgical microscope.

Figure 5:
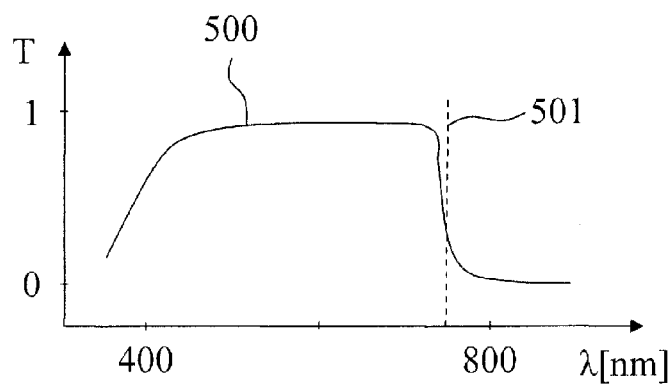
FIG. 5 shows the filter characteristic of a second filter disc.

FIG. 5 shows the filter characteristic 500 of the filter disc 303 of FIG. 3. The filter disc 303 functions as an infrared fluorescence excitation filter. During operation of the surgical microscope, this filter disc is brought into the illuminating beam path for the visualization of images which are based on the fluorescence of ICG. The filter characteristic 500 has a steep filter edge 501 at the wavelength 780 nm. This ensures that, with the illuminating arrangement, light, whose wavelength lies in the excitation band for the fluorescence of ICG, is guided to the object region while, however, at the same time, the object region is not burdened with illuminating light whose wavelength lies in the range of the fluorescence wavelength of ICG.

Figure 6:
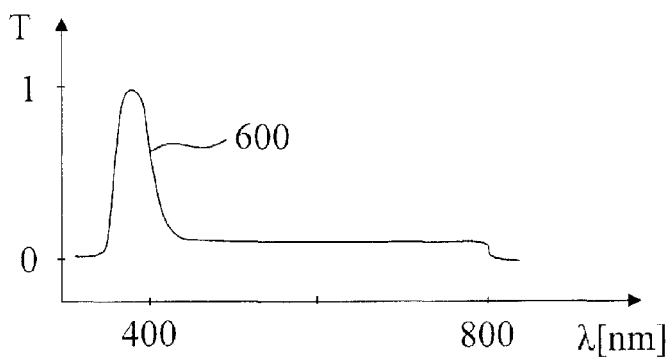
FIG. 6 shows the filter characteristic of a third filter disc.

FIG. 6 shows the filter characteristic 600 of the filter disc 304 in the filter wheel 114 of FIG. 3. The filter disc 304 functions as a blue-light fluorescence excitation filter. The filter disc 304 is switched into the illuminating beam path of the illuminating arrangement 101 of the surgical microscope 100 of FIG. 1 for the operation of the surgical microscope in a mode for exciting the fluorescence of the dye 5-ALA. The filter characteristic 600 ensures the transmission of light in the ultraviolet range below the wavelength of 400 nm whereat the fluorescence of the dye 5-ALA can be excited.

With the illuminating light of the illuminating arrangement of a surgical microscope, patient tissue can be damaged by thermal and phototoxic load. The danger of tissue damage is that much greater the more intense the illuminating light is with which a surgical region is illuminated. To bring the dyes ICG and 5-ALA to fluorescence with the high-power light source 102 in the illuminating arrangement 101 of the surgical microscope 100 of FIG. 1, it is necessary that a very intense illuminating light be made available.

In order to ensure that inadvertent damage of patient tissue is avoided during routine operation of the surgical microscope 100 of FIG. 1, the illuminating arrangement 101 has a control unit 170 which makes possible the adjustment of the intensity of the illuminating light conducted to the region of surgery which, however, depending upon operating mode of the illuminating arrangement, ensures that the maximum light intensity does not exceed a pregiven adjustable threshold value.

The control unit 170 includes a data memory 171 and an operator-controlled module 172 having a touch-sensitive display screen 173 as input/output interface. The operation of the surgical microscope 100 for illuminating the region of surgery with white light can be activated via the touch-sensitive display screen 173 for the illumination of the region of surgery with light for exciting the fluorescence of ICG and for illuminating the region of surgery with light for exciting the fluorescence of the dye 5-ALA. For this purpose, corresponding control fields on the display screen must be touched by the operating person.

FIG. 7 shows the input menu 700 of the touch-sensitive display screen 173 in the surgical microscope 100 of FIG. 1. The adjustment of values for the light source intensity activation value and for the intensity of the illuminating light outputted by the illuminating arrangement can be carried out via so-called sliders (701, 702). The input menu also includes a numeric keypad 703. This numeric keypad 703 makes possible the input of personalized apparatus configurations. With the input of a personal data code via the touch-sensitive display screen 173 of the control unit of the illuminating arrangement 101 of FIG. 1, a personal presetting of the apparatus can be called up. By means of the numerical keypad 703, it is possible to set the activation values for the intensity of the illuminating light, which are stored in the data memory, in the case of: white light, light for exciting the fluorescence of ICG as well as light for exciting the fluorescence of the dye 5-ALA. The illuminating light is made available by the illuminating arrangement 101. For the reason of safety, it is provided that first a license key is inputted via the keypad. In this way, the control unit 170 of FIG. 1 is transferred into a service operating mode and an input menu is called up for adjusting the activation values.

A patient damage warning unit 174 is assigned to the control unit 170. When adjusting operating parameters for the illuminating arrangement, which cannot preclude damage to the patient by illuminating light, a warning signal generator 175 is driven in the patient damage warning device 174. This warning device 174 then emits an acoustic warning signal and an optical warning signal. Alternatively, the warning signal generator 175 can be configured to emit an only acoustic warning signal or only an optical warning signal. It is also possible to configure the warning signal generator for the output of a touch-detectable warning signal.

When activating the white light, the filter disc 302 of FIG. 3 is moved into the illuminating beam path by rotating the filter wheel 114. Then, the sieve filter disc 200 of FIG. 2 of the filter unit 112 is set to a white light operation activating value. Only then is the high-power light source 102 activated for operation. The white light activation value corresponds to an adjustment value for the disc 200 of the filter unit 112 stored in the data memory 171. This adjustment value is stored in the data memory 171 by the manufacturer. The adjustment value has preferably a value for the attenuation of light of the high-power light source 102 to 25% of the light quantity made available by the high-power light source 102.

The touch-sensitive display screen 173 permits setting a white light operation activation value. If the white light operation activation value is set to a value, which exceeds the value of the manufacturer's value for the white light operation activation value, which is stored in the data memory 171, the output of a warning signal results with the warning signal generator 175 in the patient damage warning device 174.

The touch-sensitive display screen 173 furthermore permits undertaking the adjustment of the intensity of the illuminating light made available by the illuminating arrangement when the white light mode of the illuminating arrangement is activated. By driving the disc 200 of FIG. 2 of the filter unit 112, the intensity of the illuminating light can be changed between the value 0 and a maximum value which corresponds to the white light operation activation value. The illuminating light originates from the high-power light source 102 of the illuminating arrangement 101 in the surgical microscope 100 of FIG. 1.

In the operating mode of the illuminating arrangement 101, the same is possible with respect to the excitation of the fluorescence of ICG. If this operating mode is activated via the touch-sensitive display screen 173, then first the filter disc 303 moves into the illuminating beam path and the sieve filter disc 200 is set to an output value which is favorable for the excitation of the fluorescence of ICG wherein no danger of damage of patient tissue is present. This activation value of the sieve filter disc 200 in the operating mode of the excitation of the fluorescence of ICG is, in turn, a value inputted at the manufacturer into the data memory 171.

This activation value corresponds, for example, to an attenuation of the light of the high-power light source 102 by means of the sieve filter disc 200 of FIG. 2 to 50% of the light made available by the high-power light source 102.

The touch-sensitive display screen 173 permits adjusting this activation value for the illuminating light for exciting the fluorescence of ICG. When the activation value is adjusted, then the warning signal generator 175 in the patient damage warning unit 174 generates a warning signal in the case when an activation value is selected which lies above the value of the activation value stored by the manufacturer in the data memory 171.

In the operating mode of the illuminating arrangement for the excitation of fluorescence of ICG, the intensity of the illuminating light made available can be adjusted via the touch-sensitive display 173 between a minimum value and a maximum value. The maximum value of the adjustment of the sieve filter disc 200 corresponds to the intensity value for the illuminating light when the operating mode for fluorescence of ICG is activated. The illuminating light is made available by the illuminating arrangement 101.

If the surgical microscope is activated for the operation "fluorescence of 5-ALA", then a shift of the filter disc 303 of FIG. 3 takes place in the illuminating beam path. A corresponding input possibility at the touch-sensitive display screen 173 is provided for activating the surgical microscope for this operation. The sieve filter disc 200 of FIG. 2 is set to a 5-ALA activation value. Thereafter, the high-power light source 102 in the surgical microscope 100 of FIG. 1 is taken into operation.

The 5-ALA activation value is an adjustment value stored in the data memory 171 for the sieve filter disc 200. This adjusting value is configured by the manufacturer and stored in the data memory 171. The adjustment value corresponds, for example, to an attenuation of light of the high-power light source of 0, that is, a setting of the sieve filter disc for maximum illuminating intensity.

By means of the touch-sensitive screen 173, it is possible to adjust this attenuation value when activating the surgical microscope operating mode for viewing the fluorescence of the dye 5-ALA. If the value for the activation value, which is stored by the manufacturer in the data memory 171, is exceeded, then a warning signal output again takes place by means of the warning signal generator 175 in the patient damage warning unit 174.

The safety limit value of the illuminating light, which is outputted by the illuminating arrangement 101 of FIG. 1, can be varied in an adjusting range via the input menu, which is shown in FIG. 7, on the touch-sensitive display screen 173 of the surgical microscope of FIG. 1 by means of the slider 702. This safety limit value can only be modified after input of a verification code via the keypad 703 on the input menu 700 of the touch-sensitive display screen 173 of FIG. 1.

The slider 701 functions to adjust the activation value of the intensity of the illuminating light outputted when activating the illuminating arrangement 101 for: white light operation, for operation for exciting the fluorescence of ICG and for operation to excite the fluorescence of the dye 5-ALA. The corresponding adjustment is, in turn, only possible after inputting of the verification code via the keypad 703 in the input menu 700 of FIG. 7.

If with the adjustment of the threshold value by an operator, another value is stored than the one inputted by the manufacturer of the apparatus in the data memory 171 of the control unit 170, then a warning signal is outputted by means of the patient damage warning unit 174 of the illuminating arrangement 101 of FIG. 1. Preferably, this warning signal is combined with a display on the touch-sensitive display screen 173 which reads as follows: "Attention, high light intensity can lead to tissue damage! Please consider the use of a lower light power". Only when this warning indication is acknowledged via a corresponding input at the touch-sensitive display screen, can the particular threshold value be changed.

Preferably, this warning indication takes place with each change of the operator of the surgical microscope when the operator wants to set another value than recommended by the manufacturer.

For the case that the maximum value for the intensity of the illuminating light, which is outputted by the illuminating arrangement, is set to a value by an operator which is less than the particular activation value during activation of the illuminating arrangement in one of the possible operating modes for the illuminating arrangement 101, then, in the control unit 170 of FIG. 1, the value of the light intensity, which is outputted during activation of the illuminating arrangement 101, is reduced to the value which is set by the operator for the maximum outputted light power.

The control unit 170 contains a control loop 190. This control loop 190 permits driving the illuminating arrangement 101 in a control operating mode. The control loop 190 is connected to the illuminating light intensity detector 120. This detector emits a position signal to the adjustable filter unit 112.

The control operating mode can be adjusted by input at the touch-sensitive display screen 173. This operating mode makes it possible to control the intensity of illuminating light to a pregiven value. The illuminating light is made available by the illuminating arrangement 101 in the surgical microscope 100 of FIG. 1. For this purpose, the instantaneously detected value for the light intensity is supplied by the illuminating light detector 120 to the control loop 190 in the control unit 170. This illuminating light intensity detector 120 is disposed on the rearward side 119 of the path-folding mirror 115 in the surgical microscope 100 of FIG. 1. This value is compared there to a desired value. Corresponding to the deviation of actual value and desired value, a position signal is then outputted to the filter unit 112 for attenuating the intensity of the illuminating light of the high-power light source 102 in the illuminating arrangement 101 of FIG. 1.

Finally, the illuminating arrangement 101 of the surgical microscope 100 of FIG. 1 contains a lamp exchange detection unit 180. The lamp exchange detection unit 180 is connected to the control unit 170. When the lamp exchange detection unit 180 detects a lamp exchange, a lamp exchange information signal is outputted to the control unit 170. In response to this lamp exchange information signal, the control unit 170 carries out a new adjustment of the activation value for each possible operating mode of the illuminating arrangement 101: the particular activation value for white light operation, for exciting the fluorescence of ICG and for exciting the fluorescence of 5-ALA is adjusted to an output value set by the manufacturer and stored in a data memory.

After each lamp exchange, the activation values for the light intensity are reset to the threshold values stored in the data memory 171 for the operation of the illuminating arrangement: in the white light mode, in the mode for the excitation of the dye ICG and in the mode for the excitation of the dye 5-ALA as well as the corresponding maximum adjustable light intensity values in the illuminating arrangement 101 of FIG. 1. The activation values were undertaken by an operator via the touch-sensitive display screen 173 and are independent of the instantaneous user settings. However, the particular values for the start intensity of the light power and the light intensity are retained in the data memory 171. The light intensity is the light intensity at which a patient damaging warning takes place. The values were set by the particular operator. After a lamp exchange and the automatic reset of the light power outputted by the illuminating arrangement 101, the operator has the possibility of again adjusting the illumination intensity with which the surgical microscope was configured before the lamp exchange.

Furthermore, the surgical microscope of FIG. 1 is designed for an emergency operation. For the case that the operator-controlled module 172 with the touch-sensitive display screen 173 becomes inoperative, the control unit 170 causes the filter unit 112 to adjust the intensity of the illuminating light, which is outputted by the illuminating arrangement, to a value of 70% of the maximum possible light power.

The light intensity, which is outputted by the illuminating arrangement, is shown on the touch-sensitive display screen preferably in red text in order to indicate to an operator of the surgical microscope 100 of FIG. 1 as to the possibility of injury to the patient with the illuminating light. This display of red text is for the case that the light intensity corresponds to the set threshold value or exceeds this value. If the intensity of the illuminating light, which is outputted by the illuminating arrangement 101 of FIG. 1, is greater than or equal to the set threshold value, a warning indication is made visible in the ocular view 136 in the viewing beam path 132 of the surgical microscope 101 of FIG. 1 by means of the display 161. This warning indication includes the numerical display of the light intensity in combination with additional exclamation marks. A good warning effect is obtained in that the display blinks, preferably, at a frequency of 0.5 Hz in a time interval of 5 seconds.

If the intensity of the illuminating light actuation outputted by the illuminating arrangement 101 drops below the instantaneously adjusted intensity threshold value, then the display of the warning indication on the touch-sensitive display screen and on the display 161, which is visible in the viewing beam path 132, is ended.

The display of information by means of the display 161 in the viewing beam path 132 is unfavorable when the surgical microscope is operated for observing fluorescence. In comparison to normal light, the light, which is generated by means of fluorescence, from the surgical region is of relatively low intensity, that is, an image in a surgical microscope, which is based on fluorescence, is usually dark. However, then additional display information in the viewing ocular is a disturbance. In the operating mode of the surgical microscope 100 for fluorescence, the display of a warning indication therefore does not take place by means of the display 161 in the right viewing beam path 132, but, only as a display on the touch-sensitive display screen 173.

The described illuminating arrangement 101 further permits outputting a warning announcement at system start when the light intensity, which is made available by the illuminating arrangement 101, corresponds to more than 25% of an apparatus-specific maximum value.

It is noted that the intensity of the illuminating light, which is made available by the illuminating arrangement 101, can be varied not only by shifting the sieve filter disc 200 but also by changing lamp current for the high-power light source 102.

It is understood that the foregoing description is that of the preferred embodiments of the invention and that various changes and modifications may be made thereto without departing from the spirit and scope of the invention as defined in the appended claims.

What is claimed is:

1. A surgical microscope for use in surgical procedures including neurosurgery, the surgical microscope comprising:
   an illuminating arrangement for providing and guiding illuminating light along a beam path to a region of surgery examined with said surgical microscope;
   said illuminating arrangement including a high-power light source for generating said illuminating light;
   an intensity adjusting device for adjusting the intensity of the illuminating light guided to said region of surgery between a maximum value and a minimum value;
   a control unit for said illuminating arrangement;
   said control unit including an operator-controlled module via which said illuminating arrangement is activated and controlled and a memory for storing a safety limit value;
   said control unit comprising a control loop;
   a sensor for detecting the intensity of said illuminating light of said illuminating arrangement;
   said sensor being provided at a path-folding mirror to receive a fraction of said illuminating light being guided to said path-folding mirror;
   a signal generator for outputting a warning signal when an intensity of said illuminating light exceeds said safety limit value stored in said memory; and,
   said fraction of said illuminating light being guided to said path-folding mirror through a bore in said path-folding mirror.

2. The surgical microscope of claim 1, said intensity adjusting device including a filter unit disposed in said beam path for attenuating said illuminating light generated by said high-power light source.

3. The surgical microscope of a claim 2, said filter unit including a non-transmissive sieve filter having a predetermined number of light passthrough openings for passing said illuminating light therethrough with said illuminating light defining a predetermined light flux.

4. The surgical microscope of claim 3, said passthrough openings each having a predetermined size; and, said sieve filter being moveable in said beam path so as to control the light flux in accordance with the number and size of said light passthrough openings disposed in said beam path.

5. The surgical microscope of claim 2, further comprising a lamp-exchange detection unit connected to said control unit and said lamp-exchange detection unit being configured to effect a setting of said filter unit to an output value when a lamp exchange is detected.

6. The surgical microscope of claim 1, wherein said control loop outputs a position signal to said intensity adjusting device for controlling said intensity of said illuminating light outputted by said illuminating arrangement to a pregiven value.

7. The surgical microscope of claim 1, said illuminating arrangement further comprising a filter unit for attenuating said illuminating light generated by said high-power light source; and, said control unit effecting a setting of said filter unit to a first illuminating-arrangement activation value whereat said illuminating light generated by said high-power light source is attenuated when said illuminating arrangement is activated via said operator-controlled module.

8. The surgical microscope of claim 1, wherein said illuminating light has a spectral composition; and, said illuminating arrangement further comprises a spectral filter for setting the spectral composition of said illuminating light.

9. The surgical microscope of claim 8, wherein said spectral filter is configured as a thermal protective filter.

10. The surgical microscope of claim 8, wherein said spectral filter is configured as an infrared fluorescence excitation filter.

11. The surgical microscope of claim 10, wherein said spectral filter is also configured as a blue-light fluorescence excitation filter.

12. The surgical microscope of claim 11, wherein said operator-controlled module includes an input unit for setting an infrared fluorescence operating mode in that said infrared fluorescence excitation filter is switched into said beam path of said illuminating light.

13. The surgical microscope of claim 12, wherein said control unit causes an adjustment of said filter unit to a second illuminating-arrangement activation value when setting said infrared fluorescence operating mode via said input unit of said operator-controlled module.

14. The surgical microscope of claim 13, wherein said operator-controlled module comprises means for setting said second illuminating-arrangement activation value.

15. The surgical microscope of claim 14, wherein said signal generator outputs a warning signal when said second illuminating-arrangement activation value set via said operator-controlled module exceeds a safety limit value for said second illuminating-arrangement activation value with said safety limit value for said second illuminating-arrangement activation value being stored in said memory.

16. The surgical microscope of claim 11, wherein said operator-controlled module includes an input unit for setting a blue-light fluorescence operating mode in that said blue-light fluorescence excitation filter is switched into said beam path of said illuminating light.

17. The surgical microscope of claim 16, wherein said control unit has an input unit and said control unit causes an adjustment of said filter unit to a third illuminating-arrangement activation value when setting said blue-light operating mode via said input unit of said operator-controlled module.

18. The surgical microscope of claim 17, wherein said operator-controlled module comprises means for setting said third illuminating-arrangement activation value.

19. The surgical microscope of claim 18, wherein said signal generator outputs a warning signal when said third illuminating-arrangement activation value set via said operator-controlled module exceeds a safety limit value for said third illuminating-arrangement activation value with said safety limit value for said third illuminating-arrangement activation value being stored in said memory.

20. The surgical microscope of claim 19, wherein said operator-controlled module comprises means for setting said filter unit between a first value for minimum intensity of said illuminating light of said illuminating arrangement and a second value for maximum intensity of said illuminating light of said illuminating arrangement.

21. The surgical microscope of claim 20, wherein said operator-controlled module includes an input unit for setting an infrared fluorescence operating mode in that said infrared fluorescence excitation filter is switched into said beam path of said illuminating light; said control unit effects a setting of said filter unit to a second illuminating-arrangement activation value when setting said infrared fluorescence operating mode via said input unit of said operator-controlled module; and, said value for said maximum intensity of said illuminating light corresponds to one of said first, second and third illuminating-arrangement activation values.

22. The surgical microscope of claim 20, wherein said operator-controlled module comprises means for setting said second value for said maximum intensity of said illuminating light of said illuminating arrangement.

23. A surgical microscope for use in surgical procedures including neurosurgery, the surgical microscope comprising:
an illuminating arrangement for providing and guiding illuminating light along a beam path to a region of surgery examined with said surgical microscope;
said illuminating arrangement including a high-power light source for generating said illuminating light;
an intensity adjusting device for adjusting the intensity of the illuminating light guided to said region of surgery between a maximum value and a minimum value;
a control unit for said illuminating arrangement;
said control unit including an operator-controlled module via which said illuminating arrangement is activated and controlled;
said control unit comprising a control loop;
a sensor for detecting the intensity of said illuminating light of said illuminating arrangement being connected to said control loop;
said sensor being provided at a path-folding mirror to receive a fraction of said illuminating light being guided to said path-folding mirror;
said intensity adjusting device including a filter unit disposed in said beam path for attenuating said illuminating light generated by said high-power light source;
said filter unit including a non-transmissive sieve filter having a predetermined number of light passthrough openings for passing said illuminating light therethrough with said illuminating light defining a predetermined light flux;
said passthrough openings each having a predetermined size;
said sieve filter being moveable in said beam path so as to control the light flux in accordance with the number and size of said light passthrough openings disposed in said beam path; and,
wherein said control loop outputs a position signal to said intensity adjusting device for controlling said intensity of said illuminating light outputted by said illuminating arrangement to a pregiven value.

24. The surgical microscope of claim 23, said control unit effecting a setting of said filter unit to a first illuminating-arrangement activation value whereat said illuminating light generated by said high-power light source is attenuated when said illuminating arrangement is activated via said operator-controlled module.

25. The surgical microscope of claim 24, wherein said operator-controlled module includes means for setting said first illuminating-arrangement activation value.

26. The surgical microscope of claim 25, further comprising a signal generator for outputting a warning signal; said control unit including a memory for storing a safety limit value; and, wherein said signal generator outputs said warning signal when said first illuminating-arrangement activation value set via said operator-controlled module exceeds a safety limit value for said first illuminating-arrangement activation value.

27. The surgical microscope of claim 26, wherein said illuminating light has a spectral composition; and, said illuminating arrangement further comprises a spectral filter for setting the spectral composition of said illuminating light.

28. The surgical microscope of claim 27, wherein said spectral filter is configured as a thermal protective filter.

29. The surgical microscope of claim 27, wherein said spectral filter is configured as an infrared fluorescence excitation filter.

30. The surgical microscope of claim 29, wherein said spectral filter is also configured as a blue-light fluorescence excitation filter.

31. The surgical microscope of claim 30, wherein said operator-controlled module includes an input unit for setting a blue-light fluorescence operating mode in that said blue-light fluorescence excitation filter is switched into said beam path of said illuminating light.

32. The surgical microscope of claim 31, wherein said control unit has an input unit and said control unit effects a setting of said filter unit to a third illuminating-arrangement activation value when setting said blue-light fluorescence operating mode via said input unit of said operator-controlled module.

33. The surgical microscope of claim 32, wherein said operator-controlled module comprises means for setting said third illuminating-arrangement activation value.

34. The surgical microscope of claim 33, wherein said signal generator outputs a warning signal when said third illuminating-arrangement activation value set via said operator-controlled module exceeds a safety limit value for said third illuminating-arrangement activation value with said safety limit value for said third illuminating-arrangement activation value being stored in said memory.

35. The surgical microscope of claim 34, wherein said operator-controlled module comprises means for setting said filter unit between a first value for minimum intensity of said illuminating light of said illuminating arrangement and a second value for maximum intensity of said illuminating light of said illuminating arrangement.

36. The surgical microscope of claim 35, wherein said value for said maximum intensity of said illuminating light corresponds to one of said first, second and third illuminating-arrangement activation values.

37. The surgical microscope of claim 35, wherein said operator-controlled module comprises means for setting said second value for said maximum intensity of said illuminating light of said illuminating arrangement.

38. The surgical microscope of claim 29, wherein said operator-controlled module includes an input unit for setting an infrared fluorescence operating mode in that said infrared fluorescence excitation filter is switched into said beam path of said illuminating light.

39. The surgical microscope of claim 38, wherein said control unit effects a setting of said filter unit to a second illuminating-arrangement activation value when setting said infrared fluorescence operating mode via said input unit of said operator-controlled module.

40. The surgical microscope of claim 39, wherein said operator-controlled module comprises means for setting said second illuminating-arrangement activation value.

41. The surgical microscope of claim 40, wherein said signal generator outputs a warning signal when said second illuminating-arrangement activation value set via said operator-controlled module exceeds a safety limit value for said second illuminating-arrangement activation value with said safety limit value for said second illuminating-arrangement activation value being stored in said memory.

42. The surgical microscope of claim 24, further comprising a lamp-exchange detection unit connected to said control unit and said lamp-exchange detection unit being configured to effect a setting of said filter unit to an output value when, a lamp exchange is detected.

* * * * *